United States Patent
Joshi et al.

(10) Patent No.: US 9,053,109 B1
(45) Date of Patent: Jun. 9, 2015

(54) SYSTEMS AND METHODS FOR EFFICIENT DATA STORAGE FOR CONTENT MANAGEMENT SYSTEMS

(75) Inventors: Shree Joshi, Maharashtra (IN); Tushar Galankar, Pune (IN)

(73) Assignee: Symantec Corporation, Mountain View, CA (US)

( * ) Notice: Subject to any disclaimer, the term of this patent is extended or adjusted under 35 U.S.C. 154(b) by 658 days.

(21) Appl. No.: 13/233,289

(22) Filed: Sep. 15, 2011

(51) Int. Cl.
*G06F 7/00* (2006.01)
*G06F 17/00* (2006.01)
*G06F 17/30* (2006.01)

(52) U.S. Cl.
CPC .... *G06F 17/30073* (2013.01); *G06F 17/30445* (2013.01); *G06F 17/30516* (2013.01); *G06F 17/30545* (2013.01)

(58) Field of Classification Search
CPC .................... G06F 17/30445; G06F 17/30516; G06F 17/30545
USPC .................................................. 707/661, 769
See application file for complete search history.

(56) References Cited

U.S. PATENT DOCUMENTS

| | | | | |
|---|---|---|---|---|
| 7,617,250 | B2 * | 11/2009 | Xu et al. | 1/1 |
| 8,370,385 | B2 * | 2/2013 | Srinivasa et al. | 707/769 |
| 2007/0260575 | A1 * | 11/2007 | Robinson et al. | 707/1 |

OTHER PUBLICATIONS

U.S. Appl. No. 12/827,945.

* cited by examiner

*Primary Examiner* — Tony Mahmoudi
*Assistant Examiner* — Merilyn Nguyen
(74) *Attorney, Agent, or Firm* — ALG Intellectual Property, LLC

(57) ABSTRACT

A computer-implemented method for efficient data storage for content management systems may include (1) identifying a content management system including a relation, wherein the implementation of the relation within the content management system supports attaching files to tuples within the relation, (2) identifying a request to retrieve a file attached to a tuple within the relation, (3) identifying a metadata store of an implementation of the tuple within the content management system, the metadata store including archive identification information identifying an archive of the tuple, (4) retrieving the file from the archive of the tuple, and (5) fulfilling the request with the retrieved file. Various other methods and systems are also disclosed.

15 Claims, 7 Drawing Sheets

SYSTEMS AND METHODS FOR EFFICIENT DATA STORAGE FOR CONTENT MANAGEMENT SYSTEMS

BACKGROUND

In the digital age, organizations must manage increasingly large volumes of data. Content management systems may help members of an organization to access shared organizational data. To this end, content management systems may organize data and structure the presentation of data to make data easy to find, organize, manipulate, and share. For example, content management systems may store and present lists of items. In some examples, these lists of items may be presented as calendars, announcements, contacts, blogs, discussion boards, surveys, and the like. A content management system may also support adding attachments to items in a list.

Because content management systems may manage large amounts of data, an organization may wish to archive some of this data. Archiving is a data storage technique that generally involves migrating data from a primary storage device to a secondary storage device (often in an attempt to reduce storage costs). For example, a business may implement archiving by migrating large amounts of data from high-performance disk drives to a more cost-effective mass storage device.

Unfortunately, archiving list items may cause unwanted inefficiencies by adding latency and other overhead to the retrieval of the list items. Conversely, failing to archive list items may result in large amounts of data going unarchived, because list items may include large attachments. Accordingly, the instant disclosure identifies and addresses a need for efficient data storage for content management systems.

SUMMARY

As will be described in greater detail below, the instant disclosure generally relates to systems and methods for efficient data storage for content management systems by copying tuples (e.g., list items) with included attachments to an archive and replacing the attachments in the original tuples with stubs. These systems and methods may then intercept attempts to retrieve the attachments and first retrieve the attachments from the archive. In one example, a computer-implemented method for efficient data storage for content management systems may include (1) identifying a content management system including a relation, wherein the implementation of the relation within the content management system supports attaching files to tuples within the relation, (2) identifying a request to retrieve a file attached to a tuple within the relation, (3) identifying a metadata store of an implementation of the tuple within the content management system, the metadata store including archive identification information identifying an archive of the tuple, (4) retrieving the file from the archive of the tuple, and (5) fulfilling the request with the retrieved file.

In one example, identifying the request to retrieve the file attached to the tuple may include intercepting a hypertext transfer protocol ("HTTP") request including the request to retrieve the file. In some examples, identifying the request may include determining that the file has been archived with the tuple and replaced with a stub attached to the tuple within the content management system. In these examples, determining that the file has been archived may include identifying metadata stored within the stub identifying the stub as a stub. Additionally or alternatively, in these examples determining that the file has been archived may include determining that the size of the stub is below a predetermined threshold. In these examples, retrieving the file from the archive of the tuple may be performed in response to determining that the file has been archived with the tuple.

In one embodiment, a plurality of files may be attached to the tuple within the content management system. In this embodiment, the computer-implemented method may also include identifying a stub attached to the tuple in place of the file, the stub including attachment identification information distinguishing the file from the other files in the plurality of files. In this embodiment, the computer-implemented method may also include retrieving the file from the archive of the tuple without retrieving the other files in the plurality of files by using the attachment identification information.

In some examples, a computer-implemented method for efficient data storage for content management systems may include (1) identifying a content management system including a relation, wherein the implementation of the relation within the content management system supports attaching files to tuples within the relation, (2) identifying at least one file attached to a tuple within the relation, (3) archiving the tuple with the file as an archival unit within an archive, (4) adding archive identification information to a metadata store of an implementation of the tuple within the content management system, the archive identification information identifying the archival unit within the archive, and (5) replacing the file attached to the tuple within the relation with a stub attached to the tuple.

In one example, archiving the tuple with the file may include archiving the tuple with the file at least in part based on the size of the file exceeding a predetermined threshold. In some examples, a plurality of files may be attached to the tuple. In these examples, the stub may include attachment identification information that distinguishes the file from other files in the plurality of files. In one example, the stub may include information identifying the stub as a stub.

In one embodiment, a system for implementing the above-described method may include an identification module programmed to identify a content management system including a relation, wherein the implementation of the relation within the content management system supports attaching files to tuples within the relation. The identification module may also be programmed to identify a request to retrieve a file attached to a tuple within the relation. The system may additionally include a location module programmed to, in response to the request, identify a metadata store of an implementation of the tuple within the content management system, the metadata store including archive identification information identifying an archive of the tuple. The system may further include a retrieval module programmed to, in response to the request, retrieve the file from the archive of the tuple. The system may also include a fulfillment module programmed to, in response to the request, fulfill the request with the retrieved file. Additionally, the system may include at least one processor configured to execute the identification module, the location module, the retrieval module, and the fulfillment module.

As will be explained in greater detail below, by copying list items with included attachments to an archive and replacing the attachments in the original tuples with stubs, and then intercepting attempts to retrieve the attachments in order to first retrieve the attachments from the archive, the systems and methods described herein may improve the storage performance of content management systems. For example, list items may remain available on primary storage, allow for quick and efficient loading and display, while large attachments attached to list items may be archived and seamlessly retrieved when required without burdening the primary storage with their large size.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
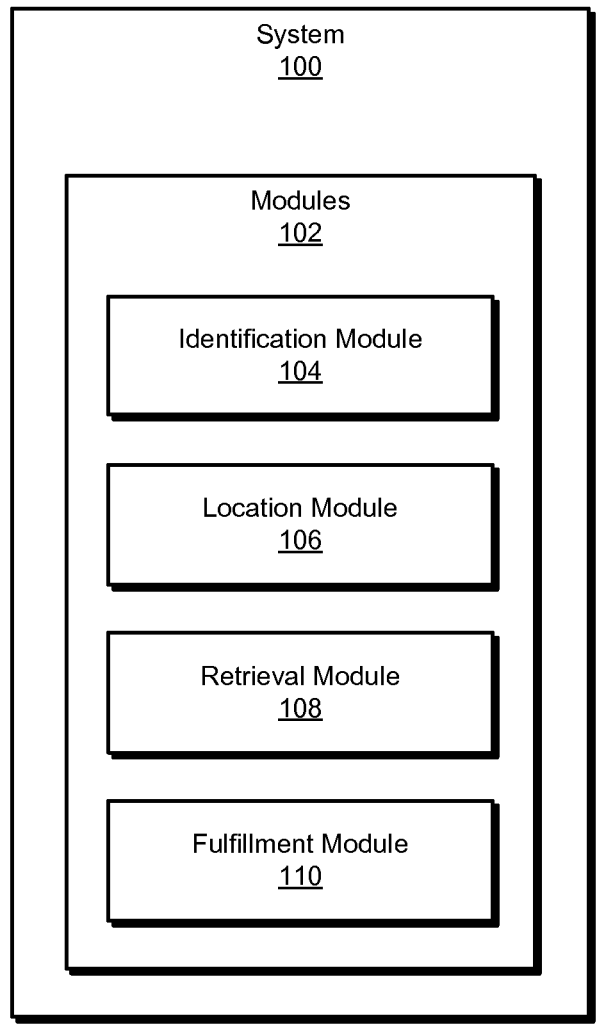
FIG. 1 is a block diagram of an exemplary system for efficient data storage for content management systems.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
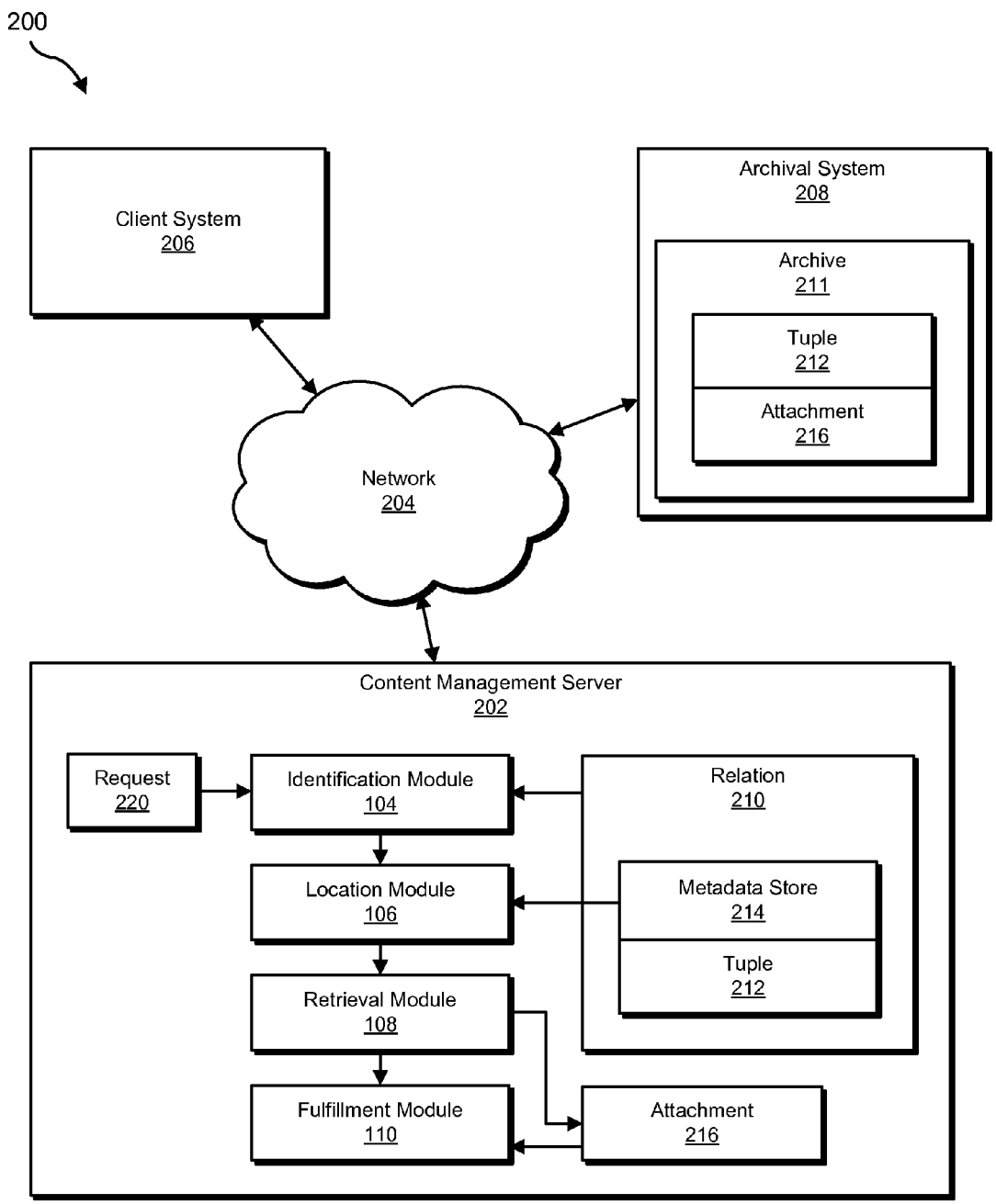
FIG. 2 is a block diagram of an exemplary system for efficient data storage for content management systems.
Figure 3:
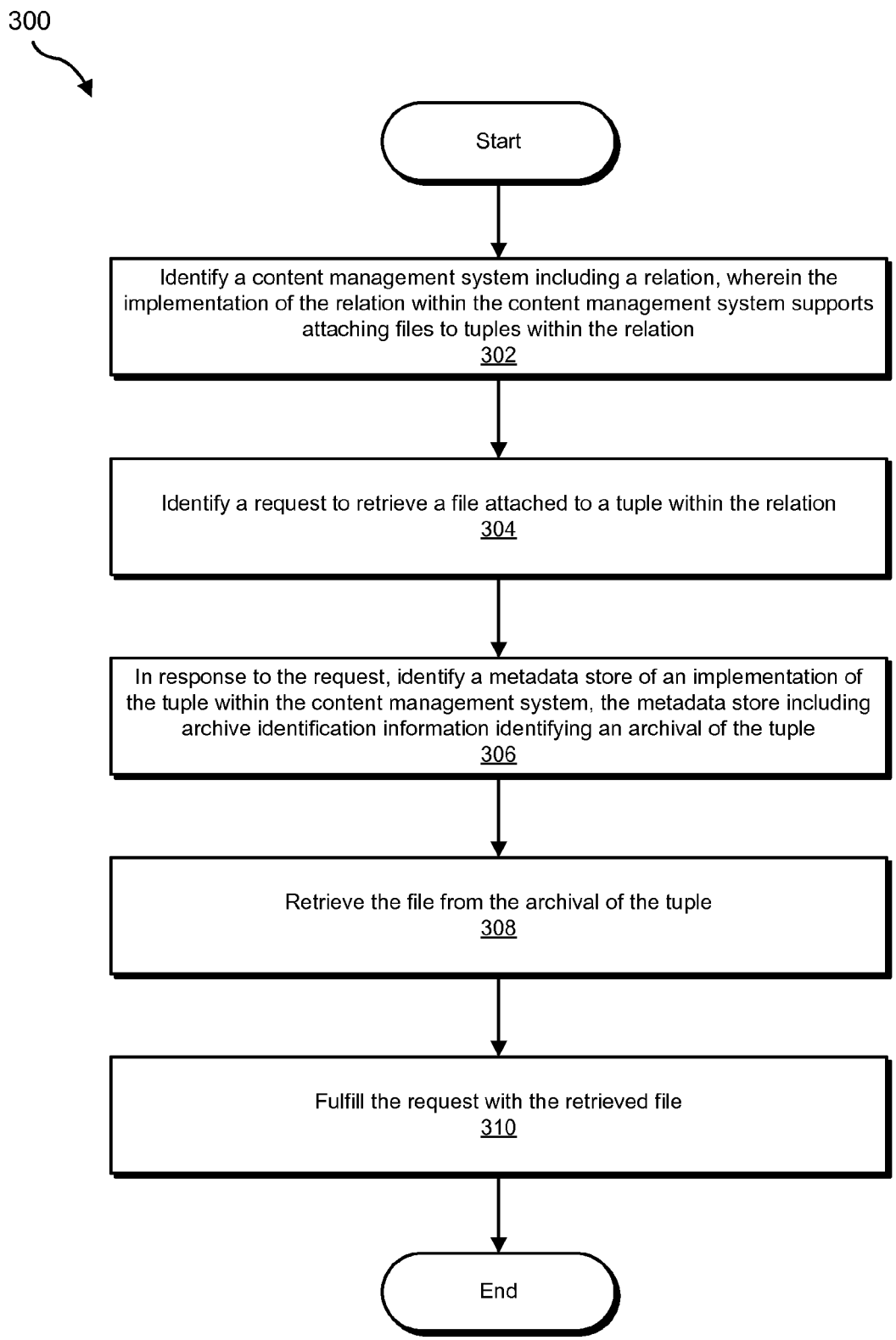
FIG. 3 is a flow diagram of an exemplary method for efficient data storage for content management systems.
Figure 4:
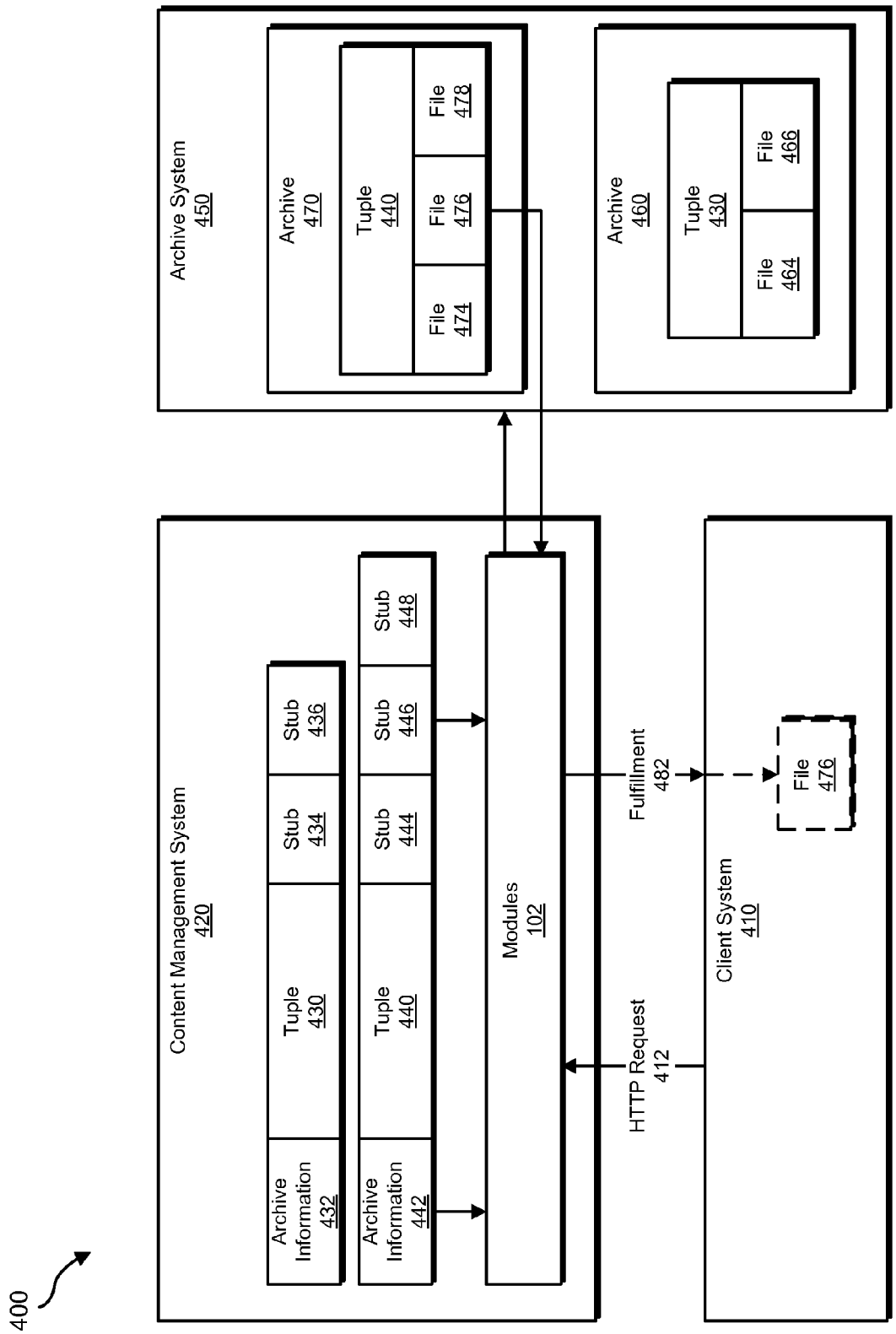
FIG. 4 is a block diagram of an exemplary system for efficient data storage for content management systems.

The following will provide, with reference to FIGS. 1, 2, and 4, detailed descriptions of exemplary systems for efficient data storage for content management systems. Detailed descriptions of corresponding computer-implemented methods will also be provided in connection with FIGS. 3 and 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for efficient data storage for content management systems. As illustrated in this figure, exemplary system 100 may include one or more modules 102 for performing one or more tasks. For example, and as will be explained in greater detail below, exemplary system 100 may include an identification module 104 programmed to identify a content management system including a relation, wherein the implementation of the relation within the content management system supports attaching files to tuples within the relation. Identification module 104 may also be programmed to identify a request to retrieve a file attached to a tuple within the relation. Exemplary system 100 may also include a location module 106 programmed to, in response to the request, identify a metadata store of an implementation of the tuple within the content management system, the metadata store including archive identification information identifying an archive of the tuple.

In addition, and as will be described in greater detail below, exemplary system 100 may include a retrieval module 108 programmed to retrieve the file from the archive of the tuple. Exemplary system may also include a fulfillment module 110 programmed to fulfill the request with the retrieved file. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., content management server 202, client system 206, and/or archival system 208), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a content management server 202 in communication with a client system 206 and an archival system 208 via a network 204. In one example, a user operating client system 20 may wish to download a file from content management server 202.

In one embodiment, one or more of modules 102 from FIG. 1 may, when executed by at least one processor of content management server 202, facilitate content management server 202 in efficient data storage for content management systems. For example, and as will be described in greater detail below, one or more of modules 102 may cause content management server 202 to (1) identify a content management system (e.g., operating on content management server 202) including a relation 210, wherein the implementation of relation 210 within the content management system supports attaching files to tuples within relation 210, (2) identify a request 220 to retrieve a file (e.g., an attachment 216) attached to a tuple 212 within relation 210, (3) identifying a metadata store 214 of an implementation of tuple 212 within the content management system, metadata store 214 including archive identification information identifying an archive 211 of tuple 212, (4) retrieving attachment 216 from archive 211, and (5) fulfilling request 220 with the attachment 216.

Content management server 202 generally represents any type or form of computing device capable of reading computer-executable instructions. Examples of content management server 202 include, without limitation, laptops, desktops, servers, cellular phones, personal digital assistants (PDAs), multimedia players, embedded systems, combinations of one or more of the same, exemplary computing system 610 in FIG. 6, or any other suitable computing device. In some examples, content management server 202 may host a content management system. Additionally or alternatively, content management server 202 may handle communications intended for the content management system and/or interface with the content management system.

Client system 206 generally represents any type or form of computing device capable of reading computer-executable instructions. Examples of client system 206 include, without limitation, laptops, desktops, servers, cellular phones, personal digital assistants (PDAs), multimedia players, embedded systems, combinations of one or more of the same, exemplary computing system 610 in FIG. 6, or any other suitable computing device.

Archival system 208 generally represents any type or form of computing device capable of storing data. Generally, archival system 208 may include any computing system, storage device, and/or combination thereof described herein.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between content management server 202, client system 206, and/or archival system 208.

FIG. 3 is a flow diagram of an exemplary computer-implemented method 300 for efficient data storage for content management systems. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a content management system including a relation, wherein the implementation of the relation within the content management system supports attaching files to tuples within the relation. For example, at step 302 identification module 104 may, as part of content management server 202 in FIG. 2, identify a content management system (e.g., operating on content management server 202) including relation 210, wherein the implementation of relation 210 within the content management system supports attaching files to tuples (such as attachment 216 to tuple 212) within relation 210.

As used herein, the term "content management system" may refer to any system capable of providing one or more views and/or interfaces for a collection of data. For example, a content management system may provide intranet portals, document checkout services, shared contacts, formatted views of information from a database, collaborative editing services, etc. As an example, the content management systems may include MICROSOFT OFFICE SHAREPOINT.

As used herein, the term "relation" may generally refer to any table, set of tuples, and/or any data structure that is isomorphic to a table and/or set of tuples. In some examples, term "relation" may refer to a list in MICROSOFT OFFICE SHAREPOINT. As used herein, the term "tuple" may generally refer to any set of data fields, ordered or unordered, including a single data field. In some examples, the term "tuple" may refer to a list item in MICROSOFT OFFICE SHAREPOINT.

The content management system may support attaching files to tuples in any of a variety of ways. For example, the content management system may support attaching files to tuples by embedding the files within the tuples, encoding the files as a part of the tuples, and/or storing tuples and their attached files as a single data object (e.g., in a single file, in a single database entry, etc.). Accordingly, auxiliary subsystems that interact with the content management system data, such as archival systems and/or backup systems, may treat a tuple and any files attached to the tuple as a single object.

Identification module 104 may identify the content management system in any suitable manner. For example, identification module 104 may identify the content management system by reading a configuration file that identifies the content management system. Additionally or alternatively, identification module 104 may identify the content management system by intercepting a communication directed to the content management system and/or intercepting a communication sent from the content management system. In some examples, identification module 104 may identify the content management system by receiving a message from the content management system. Additionally or alternatively, identification module 104 may identify the content management system by operating as a part of the content management system (e.g., as a plug-in).

FIG. 4 illustrates an exemplary system 400 for efficient data storage for content management systems. As shown in FIG. 4, system 400 may include a client system 410 in communication with a content management system 420, which in turn may be in communication with an archive system 450. Using FIG. 4 as an example, at step 302 identification module 104 may identify content management system 420.

Returning to FIG. 3, at step 304 one or more of the systems described herein may identify a request to retrieve a file attached to a tuple within the relation. For example, at step 304 identification module 104 may, as part of content management server 202 in FIG. 2, identify request 220 to retrieve attachment 216 attached to tuple 212.

Identification module 104 may identify the request in any suitable manner. For example, identification module 104 may intercept an HTTP request including the request to retrieve the file. For example, the HTTP request be generated by a client-side interaction with the content management system (e.g., clicking on a link to download the file presented by the content management system). Identification module 104 may be configured to intercept the HTTP request in any of a variety of ways. For example, identification module 104 may operate as part of a computing system configured to receive network traffic destined for the content management system. In some examples, identification module 104 may intercept the HTTP request by using HttpModule within the MICROSOFT ASP.NET framework. Additionally or alternatively, identification module 104 may operate as part of an archive system configured to retrieve archived data objects. For example, identification module 104 may operate as part of SYMANTEC ENTERPRISE VAULT.

In some examples, identification module 104 may, as a part of identifying the request to retrieve the file, determine that the file has been archived with the tuple and replaced with a stub attached to the tuple within the content management system. The term "archiving," as used herein, generally refers to any type of data transfer (or data storage) technique that involves migrating data from at least one computing (or storage) device to at least one additional computing (or storage) device and replacing the migrated data with a placeholder (e.g., a reference, a stub, etc.).

Identification module 104 may determine that the file has been archived with the tuple and replaced with a stub in any of a variety of ways. For example, identification module 104 may identify metadata stored within the stub identifying the stub as a stub. For example, the stub may include a predetermined stub identifier. As an illustration, the stub may include only the text "EVSTUB#1," where "EVSTUB#" identifies the stub as a stub created by SYMANTEC ENTERPRISE VAULT. In another example, identification module 104 may determine that the file has been archived and replaced with a stub by determining that the size of the stub is below a predetermined threshold. For example, if the apparent attachment to the tuple within the content management system is below 64 bytes, identification module 104 may determine (based on the size alone or in combination with other evidence) that the stub is a stub and not the original attachment.

Using FIG. 4 as an example, content management system 420 may include a tuple 430 and a tuple 440. Tuple 430 may be archived in archive system 450 in an archive 460 with two attachments, a file 464 and a file 466. Tuple 440 may be archived in archive system 450 in an archive 470 with three attachments, a file 474, a file 476, and a file 478. On content management system 420, file 464 may be replaced with a stub 434 and file 466 may be replaced with a stub 436. Likewise, file 474 may be replaced with a stub 444, file 476 may be replaced with a stub 446, and file 478 may be replaced with stub 448. At step 304 identification module 104 may, as part of content management system 420, identify an HTTP request 412 to retrieve a file 476 attached to a tuple 440 (file 476 being replaced by a stub 446 on content management system 420).

Returning to FIG. 3, at step 306 one or more of the systems described herein may, in response to the request, identify a metadata store of an implementation of the tuple within the content management system, the metadata store including archive identification information identifying an archive of the tuple. For example, at step 306 location module 106 may, as part of content management server 202 in FIG. 2, identify metadata store 214 of tuple 212, metadata store 214 identifying archive 211 of tuple 212. Using FIG. 4 as an example, at step 306 location module 106 may, as part of content management system 420, identify archive information 442 (e.g., identifying the location of archive 470).

As used herein, the phrase "metadata store" may include any location and/or data structure used for storing metadata relating to a tuple. In some examples, the phrase "metadata store" may refer to the property bag of a list item in MICROSOFT OFFICE SHAREPOINT. As used herein, the phrase "archive identification information" may refer to any information identifying the archive of the tuple and/or identifying a location of the archive of the tuple.

Location module 106 may perform step 306 in any suitable manner. For example, location module 106 may interface with the content management system to request the archive identification information from the metadata store of the tuple.

In some examples, a plurality of files may be attached to the tuple within the content management system. In these examples, location module 106 may also identify a stub attached to the tuple in place of the file, the stub including attachment identification information distinguishing the file from the other files in the plurality of files. As an illustration, the stub may include only the text "EVSTUB#1," where "1" represents which file within the archive corresponds to the stub. Using FIG. 4 as an example, location module 106 may read archive information 442 to determine that tuple 440 is stored in archive 470. Location module 106 may then read the contents of stub 446 to determine that stub 446 corresponds to file 476 within archive 470. As will be explained in greater detail below, in some examples the systems and methods described herein may then use these determinations to retrieve only the requested attachment (e.g., file 476) without retrieving any other files (e.g., files 474 and 478).

As mentioned earlier, in some examples the systems and methods described herein may determine that the attachment is a stub by inspecting the contents of the attachment and/or by examining the size of the attachment. Additionally or alternatively, location module 106 may determine that the attachment is a stub based on the metadata store. For example, location module 106 may determine that the attachment is a stub based on identifying the archive identification information in the metadata store. As mentioned earlier, in some examples the metadata store may store metadata for the tuple. For example, the metadata store may store metadata for the tuple only. Accordingly, the presence of the archive identification information in the metadata store may indicate that one or more attachments to the tuple may be stubs.

Returning to FIG. 3, at step 308 one or more of the systems described herein may, in response to the request, retrieve the file from the archive of the tuple. For example, at step 308 retrieval module 108 may, as part of content management server 202 in FIG. 2, retrieve attachment 216 from archive 211 of tuple 212. Using FIG. 4 as an example, at step 308 retrieval module 108 may, as part of content management system 420, retrieve file 476 from archive 470 of tuple 440.

Retrieval module 108 may perform step 308 in any of a variety of ways. As mentioned earlier, in some examples identification module 104 may determine that the file has been archived with the tuple and replaced on the content management system with a stub. In these examples, retrieval module 108 may retrieve the file from the archive of the tuple in response to determining that the file has been archived with the tuple.

In some examples, retrieval module 108 may retrieve only the file from the archive. For example, as mentioned earlier, in some examples a plurality of files may be attached to the tuple within the content management system. In these examples, location module 106 may also identify a stub attached to the tuple in place of the file, the stub including attachment identification information distinguishing the file from the other files in the plurality of files. Accordingly, in these examples retrieval module 108 may retrieve only the file indicated in the attachment identification information. Using FIG. 4 as an example, retrieval module 108 may retrieve file 476 without retrieving file 474 or file 478.

Returning to FIG. 3, at step 310 one or more of the systems described herein may fulfill the request with the retrieved file. For example, at step 310 fulfillment module 110 may, as part of content management server 202 in FIG. 2, fulfill request 220 with attachment 216. Using FIG. 4 as an example, at step 310 fulfillment module 110 may, as part of content management system 420, fulfill HTTP request 412 with file 476 (e.g., as shown by fulfillment 482).

Fulfillment module 110 may perform step 310 in any of a variety of ways. In some examples, fulfillment module 110 may deliver the file directly to a client that sent the request in response to the request. Additionally or alternatively, fulfillment module 110 may replace a stub of the file on the content management system with the file and fulfill the request by allowing the request to proceed. After step 310, method 300 may terminate.

Figure 5:
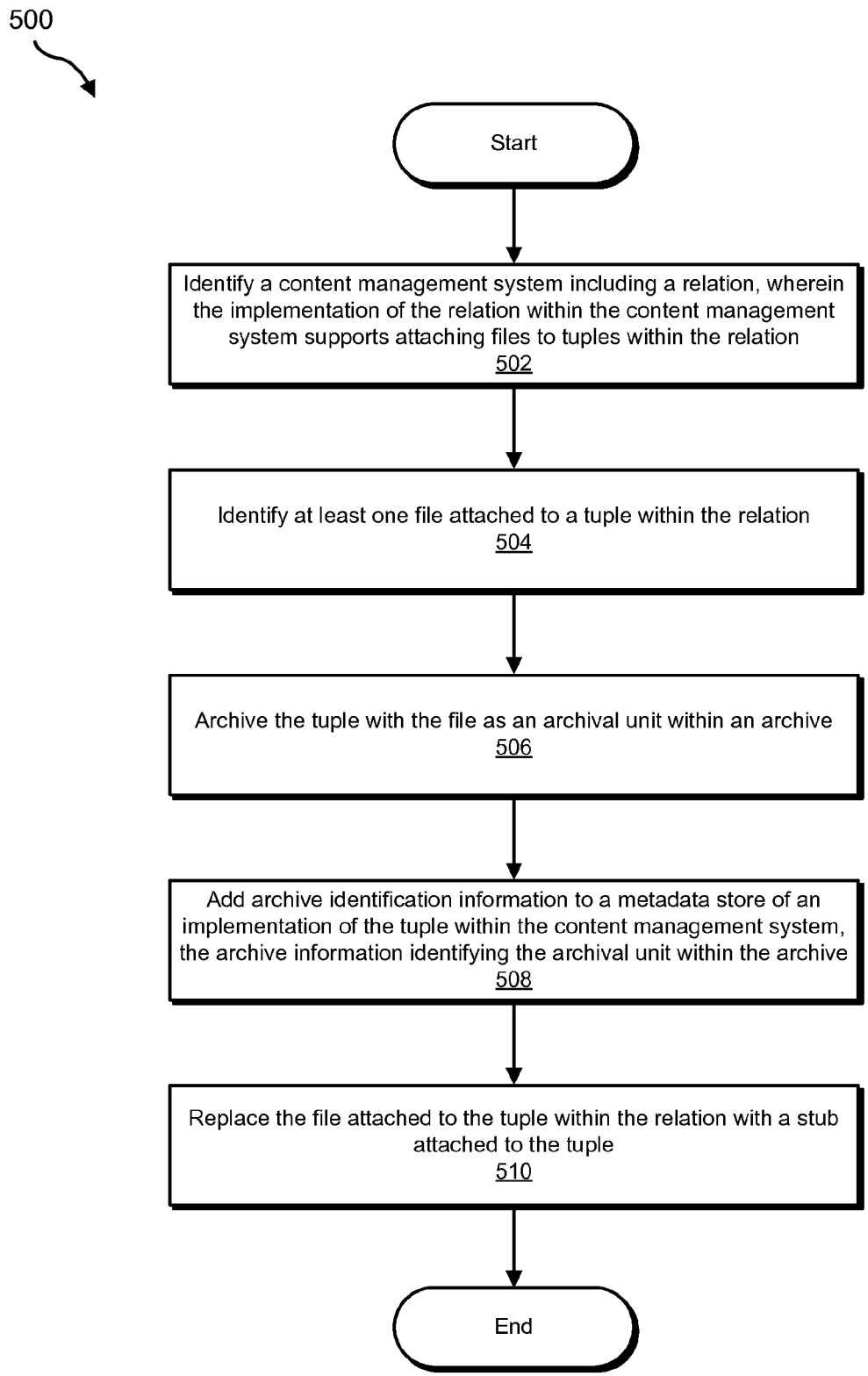
FIG. 5 is a flow diagram of an exemplary method for efficient data storage for content management systems.

FIG. 5 is a flow diagram of an exemplary computer-implemented method 500 for efficient data storage for content management systems. The steps shown in FIG. 5 may be performed by any suitable computer-executable code and/or computing system. In some embodiments, the steps shown in FIG. 5 may be performed by one or more of the components of system 100 in FIG. 1, system 200 in FIG. 2, computing system 610 in FIG. 6, and/or portions of exemplary network architecture 700 in FIG. 7.

As illustrated in FIG. 5, at step 502 one or more of the systems described herein may identify a content management system including a relation, wherein the implementation of the relation within the content management system supports attaching files to tuples within the relation. The systems described herein may identify the content management system in any suitable manner. For example, these systems may identify the content management system by reading a configuration file that identifies the content management system. Additionally or alternatively, these systems may identify the content management system by intercepting a communication directed to the content management system and/or intercepting a communication sent from the content management system. In some examples, these systems may identify the content management system by receiving a message from the content management system. Additionally or alternatively, these systems may identify the content management system by identifying data stored by the content management system to be archived.

At step 504, one or more of the systems described herein may identify at least one file attached to a tuple within the relation. The systems described herein may identify the file attached to the tuple in any of a variety of ways. For example, these systems may identify the file by querying the content management system. Additionally or alternatively, these systems may identify the file by parsing a data store of the content management system. In some examples, these systems may identify the file by identifying stored tuples of a size above a predetermined threshold (e.g., indicating one or more large attachments).

At step 506, one or more of the systems described herein may archive the tuple with the file as an archival unit within an archive. As used herein, the phrase "archival unit" may refer to any set of data identified as a single unit. The systems described herein may archive the tuple with the file in any suitable manner. In some examples, these systems may archive the tuple with the file by archiving a single data object representing the tuple and including the file. In some examples, these systems may archive the tuple with the file by copying the tuple with the file to the archive but without removing the tuple from its original location (e.g., on a primary storage device used for storage by the content management system). In one example, these systems may archive the tuple with the file at least in part based on the size of the file exceeding a predetermined threshold. As an illustration, these systems may archive only tuples with attachments exceeding 1 megabyte in size.

At step 508, one or more of the systems described herein may add archive identification information to a metadata store of an implementation of the tuple within the content management system, the archive identification information identifying the archival unit within the archive. The systems described herein may add the archive identification information to the metadata stored in any suitable manner. For example, these systems may receive a message from an archival system indicating the location of the archive including the tuple with the file. These systems may then interface with the content management system to add the location to the metadata store. Additionally or alternatively, these systems may modify data stored by the content management system to add the location to the metadata store. In one example, the content management system may include MICROSOFT OFFICE SHAREPOINT and the metadata store may include a property bag of a list item.

At step 510, one or more of the systems described herein may replace the file attached to the tuple within the relation with a stub attached to the tuple. The systems described herein may replace the file with the stub in any of a variety of ways. For example, these systems may interface with the content management system to remove the file from the tuple and to add a new file (e.g., the stub) to the tuple. In some examples, the stub may include metadata matching the file. For example, the stub may have the same name and/or title as the file. In another example, these systems may replace the file with the stub by locating the file stored in a data store of the content management system, and modifying the data store such that the stub is attached to the tuple instead of the file.

In some examples, a plurality of files may be attached to the tuple. In these examples, the stub may include attachment identification information that distinguishes the file from other files in the plurality of files. For example, if a tuple includes three attachments, the systems described herein may replace each attachment with a stub. The contents of the stubs may include, respectively, "EVSTUB#1," "EVSTUB#2," and "EVSTUB#3." In this example, the numbers in sequence may represent which the order in which files are attached to the tuple as stored in the archive of the tuple.

In one example, the stub may include information identifying the stub as a stub. For example, the stub may include a predetermined stub identifier. As an illustration, continuing the example provided above, the stub may include only the text "EVSTUB#1," where "EVSTUB#" identifies the stub as a stub created by SYMANTEC ENTERPRISE VAULT. After step 510, method 500 may terminate.

As explained above, by copying list items with included attachments to an archive and replacing the attachments in the original tuples with stubs, and then intercepting attempts to retrieve the attachments in order to first retrieve the attachments from the archive, the systems and methods described herein may improve the storage performance of content management systems. For example, list items may remain available on primary storage, allow for quick and efficient loading and display, while large attachments attached to list items may be archived and seamlessly retrieved when required without burdening the primary storage with their large size.

Figure 6:
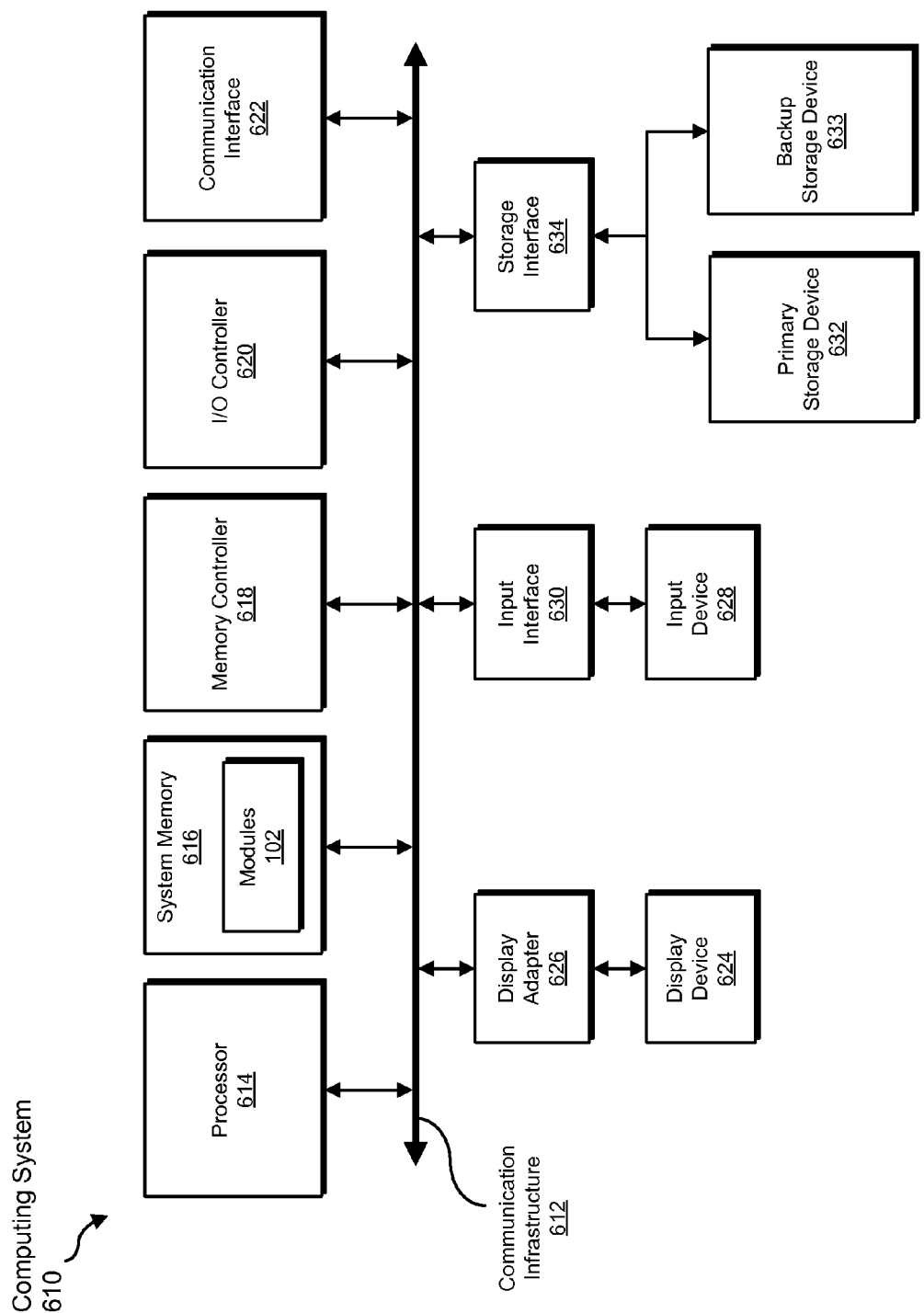
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 410 may perform and/or be a means for performing, either alone or in combination with other elements, one or more of the identifying, intercepting, determining, retrieving, archiving, adding, and/or replacing steps described herein. All or a portion of computing system 410 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
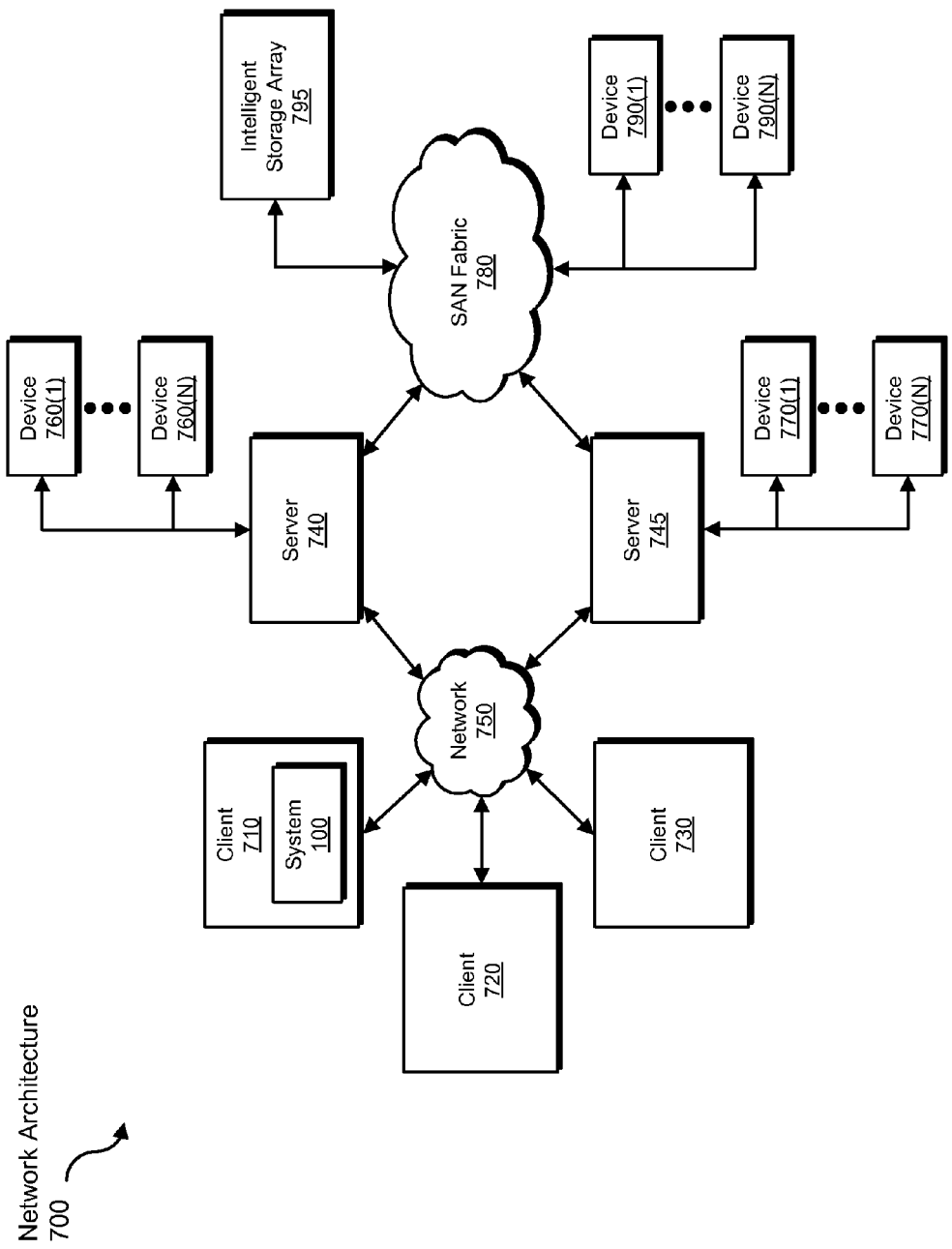
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the identifying, intercepting, determining, retrieving, archiving, adding, and/or replacing steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for efficient data storage for content management systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into an efficient storage system for content management systems. As another example, one or more of the modules recited herein may transform a content management system into a content management system with efficient storage capabilities.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for efficient data storage for content management systems, at least a portion of the method being performed by a computing device comprising at least one processor, the method comprising:
   identifying a content management system comprising a relation, wherein the implementation of the relation within the content management system supports attaching files to tuples within the relation;
   identifying a request to retrieve a file attached to a tuple within the relation, wherein a plurality of files are attached to the tuple and wherein identifying the request to retrieve the file comprises determining that the file has been archived with the tuple and replaced with a stub attached to the tuple within the content management system;
   in response to the request:
      identifying the stub attached to the tuple in place of the file, the stub comprising attachment identification information distinguishing the file from the other files in the plurality of files;
      identifying a metadata store of an implementation of the tuple within the content management system, the metadata store comprising archive identification information identifying an archive of the tuple;
      retrieving the file from the archive of the tuple in response to determining that the file has been archived with the tuple without retrieving the other files in the plurality of files by using the attachment identification information;
      fulfilling the request with the retrieved file;
   wherein the file was previously archived by:
      archiving the tuple with the file as an archival unit within the archive;
      adding the archive identification information to the metadata store of the implementation of the tuple within the content management system, the archive identification information identifying the archival unit within the archive;
      replacing the file attached to the tuple within the relation with the stub attached to the tuple.

2. The computer-implemented method of claim 1, wherein identifying the request to retrieve the file attached to the tuple within the relation comprises intercepting a hypertext transfer protocol request comprising the request.

3. The computer-implemented method of claim 1, wherein determining that the file has been archived with the tuple and replaced with the stub comprises identifying metadata stored within the stub identifying the stub as a stub.

4. The computer-implemented method of claim 1, wherein determining that the file has been archived with the tuple and replaced with the stub comprises determining that the size of the stub is below a predetermined threshold.

5. A system for efficient data storage for content management systems, the system comprising:
   an identification module programmed to:
   identify a content management system comprising a relation, wherein the implementation of the relation within the content management system supports attaching files to tuples within the relation;
   identify a request to retrieve a file attached to a tuple within the relation, wherein a plurality of files are attached to the tuple and wherein the identification module is programmed to identify the request to retrieve the file by determining that the file has been archived with the tuple and replaced with a stub attached to the tuple within the content management system;
   a location module programmed to, in response to the request:
      identify a metadata store of an implementation of the tuple within the content management system, the metadata store comprising archive identification information identifying an archive of the tuple;
      identify the stub attached to the tuple in place of the file, the stub comprising attachment identification information distinguishing the file from the other files in the plurality of files;
   a retrieval module programmed to, in response to the request, retrieve the file from the archive of the tuple in response to the location module determining that the file has been archived with the tuple without retrieving the other files in the plurality of files by using the attachment identification information;
   a fulfillment module programmed to, in response to the request, fulfill the request with the retrieved file, wherein the file was previously archived by:
      archiving the tuple with the file as an archival unit within the archive;
      adding the archive identification information to the metadata store of the implementation of the tuple within the content management system, the archive identification information identifying the archival unit within the archive;

replacing the file attached to the tuple within the relation with the stub attached to the tuple;

at least one processor configured to execute the identification module, the location module, the retrieval module, and the fulfillment module.

6. The system of claim 5, wherein the identification module is programmed to identify the request to retrieve the file attached to the tuple within the relation by intercepting a hypertext transfer protocol request comprising the request.

7. The system of claim 5, wherein the location module is programmed to determine that the file has been archived with the tuple and replaced with the stub by identifying metadata stored within the stub identifying the stub as a stub.

8. The system of claim 5, wherein the location module is programmed to determine that the file has been archived with the tuple and replaced with the stub by determining that the size of the stub is below a predetermined threshold.

9. The system of claim 5, wherein:

a plurality of files are attached to the tuple;

the stub comprises attachment identification information that distinguishes the file from other files in the plurality of files.

10. The system of claim 5, wherein the stub comprises information identifying the stub as a stub.

11. The system of claim 5, wherein the archival module archives the tuple with the file based at least in part on the size of the file exceeding a predetermined threshold.

12. A non-transitory computer-readable storage medium comprising one or more computer-executable instructions that, when executed by at least one processor of a computing device, cause the computing device to:

identify a content management system comprising a relation, wherein the implementation of the relation within the content management system supports attaching files to tuples within the relation;

identify a request to retrieve a file attached to a tuple within the relation, wherein a plurality of files are attached to the tuple and wherein identifying the request to retrieve the file comprises determining that the file has been archived with the tuple and replaced with a stub attached to the tuple within the content management system;

in response to the request:

identify the stub attached to the tuple in place of the file, the stub comprising attachment identification information distinguishing the file from the other files in the plurality of files;

identify a metadata store of an implementation of the tuple within the content management system, the metadata store comprising archive identification information identifying an archive of the tuple;

retrieve the file from the archive of the tuple in response to determining that the file has been archived with the tuple without retrieving the other files in the plurality of files by using the attachment identification information;

fulfill the request with the retrieved file;

wherein the file was previously archived by:

archiving the tuple with the file as an archival unit within the archive;

adding the archive identification information to the metadata store of the implementation of the tuple within the content management system, the archive identification information identifying the archival unit within the archive;

replacing the file attached to the tuple within the relation with the stub attached to the tuple.

13. The non-transitory computer-readable storage medium of claim 12, wherein identifying the request to retrieve the file attached to the tuple within the relation comprises intercepting a hypertext transfer protocol request comprising the request.

14. The non-transitory computer-readable storage medium of claim 12, wherein determining that the file has been archived with the tuple and replaced with the stub comprises identifying metadata stored within the stub identifying the stub as a stub.

15. The non-transitory computer-readable storage medium of claim 12, wherein determining that the file has been archived with the tuple and replaced with the stub comprises determining that the size of the stub is below a predetermined threshold.

* * * * *